(12) United States Patent
Parsons

(10) Patent No.: US 9,938,746 B2
(45) Date of Patent: Apr. 10, 2018

(54) SNAP-LOCKING HINGE JOINT

(71) Applicant: Timothy Parsons, Napa, CA (US)

(72) Inventor: Timothy Parsons, Napa, CA (US)

( * ) Notice: Subject to any disclaimer, the term of this patent is extended or adjusted under 35 U.S.C. 154(b) by 0 days.

(21) Appl. No.: 15/203,744

(22) Filed: Jul. 6, 2016

(65) Prior Publication Data

US 2017/0009803 A1    Jan. 12, 2017

Related U.S. Application Data

(60) Provisional application No. 62/189,166, filed on Jul. 6, 2015.

(51) Int. Cl.
| | |
|---|---|
| *E04H 15/48* | (2006.01) |
| *F16C 11/10* | (2006.01) |
| *E04H 15/00* | (2006.01) |
| *F16M 11/06* | (2006.01) |
| *A01M 31/02* | (2006.01) |
| *E04H 15/58* | (2006.01) |

(52) U.S. Cl.
CPC ........... *E04H 15/48* (2013.01); *E04H 15/001* (2013.01); *F16C 11/10* (2013.01); *F16M 11/06* (2013.01); *A01M 31/025* (2013.01); *E04H 15/58* (2013.01); *Y10T 403/32336* (2015.01); *Y10T 403/32352* (2015.01)

(58) Field of Classification Search
CPC ..... Y10T 403/32262; Y10T 403/32319; Y10T 403/32327; Y10T 403/32336; Y10T 403/32352; Y10T 403/32409; A01M 31/025; E04H 15/001; E04H 15/48; E04H 15/58; F16C 11/10

USPC .......... 403/84, 91, 92, 93, 95, 102; 135/143; 248/220.21, 222.51, 222.52, 288.11, 248/291.1

See application file for complete search history.

(56) References Cited

U.S. PATENT DOCUMENTS

| | | | | |
|---|---|---|---|---|
| 4,286,353 | A * | 9/1981 | Roche .................. | E04B 1/3441 16/341 |
| 4,641,395 | A * | 2/1987 | Banks .................... | A01K 91/08 16/348 |
| 5,251,359 | A * | 10/1993 | Finkl ...................... | E05D 11/06 16/348 |
| 5,938,223 | A * | 8/1999 | Kotlier .................. | B62K 13/02 280/204 |
| 6,478,500 | B1 * | 11/2002 | Farenholtz ............... | A47F 8/00 223/66 |

(Continued)

*Primary Examiner* — Joshua Skroupa
*Assistant Examiner* — Cory B Siegert
(74) *Attorney, Agent, or Firm* — Brian Beverly; Beeson Skinner Beverly, LLP

(57) ABSTRACT

A snap-locking hinge joint includes a clevis member and a flange member. The clevis member has a clevis base from which extend a pair of parallel arms forming a gap therebetween. Each of the arms has a pivot side and an engagement face transversely opposite the pivot side, and each of the arms has a locking recess formed in the engagement face adjacent the clevis base. The flange member has a flange base from which extends a planar rib and a pair of locking fingers. The locking fingers each have an inwardly protruding locking tip. The rib is received in the gap of the clevis member. The arms are pivotally engaged with the rib thereby pivotally interconnecting the clevis and flange members. In a locked configuration, the locking tips of the locking fingers are captured in the locking recesses of the arms of the clevis member.

10 Claims, 5 Drawing Sheets

(56) References Cited

U.S. PATENT DOCUMENTS

| | | | | |
|---|---|---|---|---|
| 6,510,568 | B1* | 1/2003 | Drobinski | A47D 7/002 |
| | | | | 5/93.1 |
| 7,003,849 | B2* | 2/2006 | Cohen | A63C 11/221 |
| | | | | 16/232 |
| 7,997,291 | B2* | 8/2011 | Gressette, III | A01M 31/02 |
| | | | | 135/117 |
| 8,186,369 | B2* | 5/2012 | Reeb | E04H 15/48 |
| | | | | 135/135 |
| 9,345,919 | B2* | 5/2016 | Publicover | A63B 5/11 |
| 2007/0221261 | A1 | 9/2007 | Bean | |
| 2008/0090704 | A1* | 4/2008 | Denis | A63B 5/11 |
| | | | | 482/28 |
| 2010/0172690 | A1* | 7/2010 | Cash | A47C 7/66 |
| | | | | 403/119 |
| 2010/0200038 | A1* | 8/2010 | Roman | E04H 15/001 |
| | | | | 135/144 |
| 2013/0206197 | A1* | 8/2013 | Hotes | E04H 15/18 |
| | | | | 135/96 |
| 2015/0159414 | A1* | 6/2015 | Sukeforth | E05D 11/1007 |
| | | | | 16/319 |

\* cited by examiner

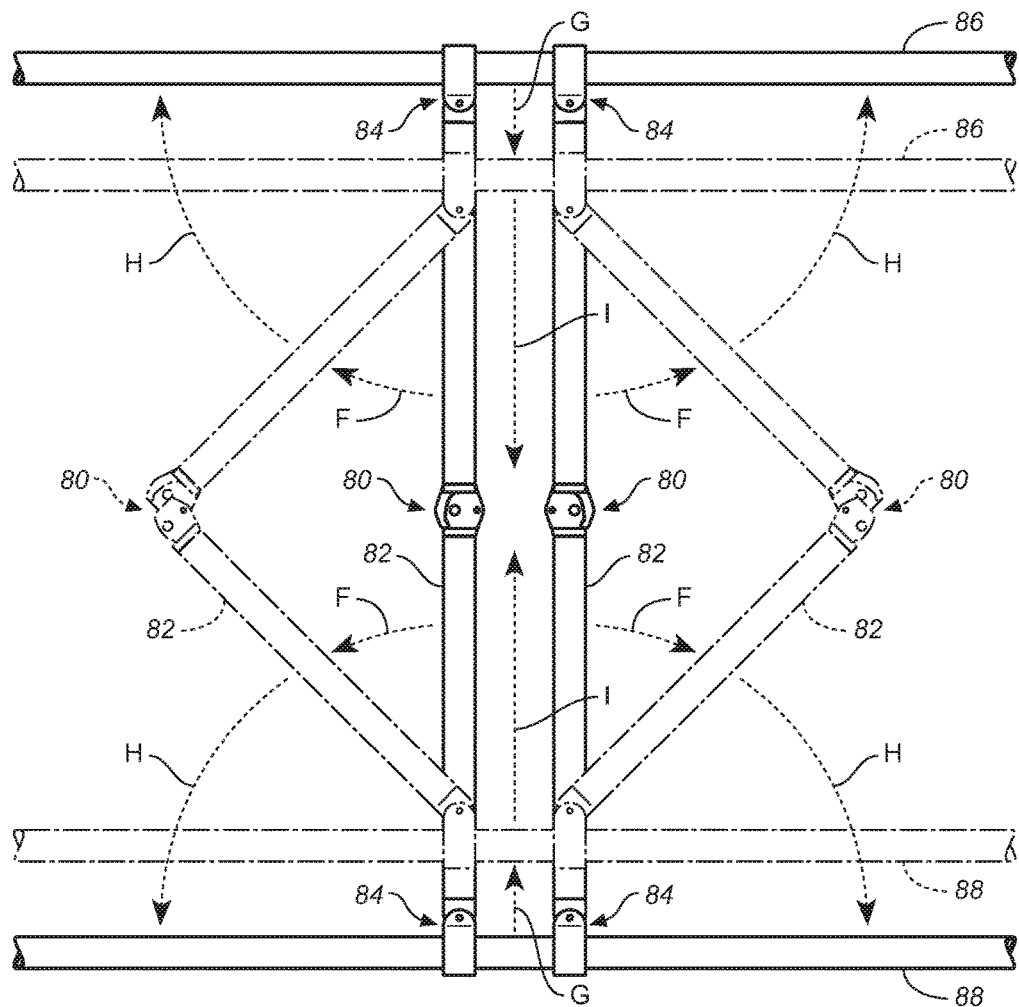
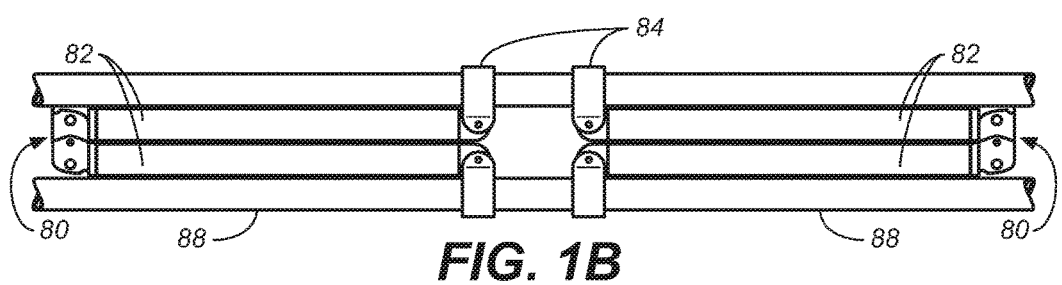
FIG. 1A
FIG. 1B

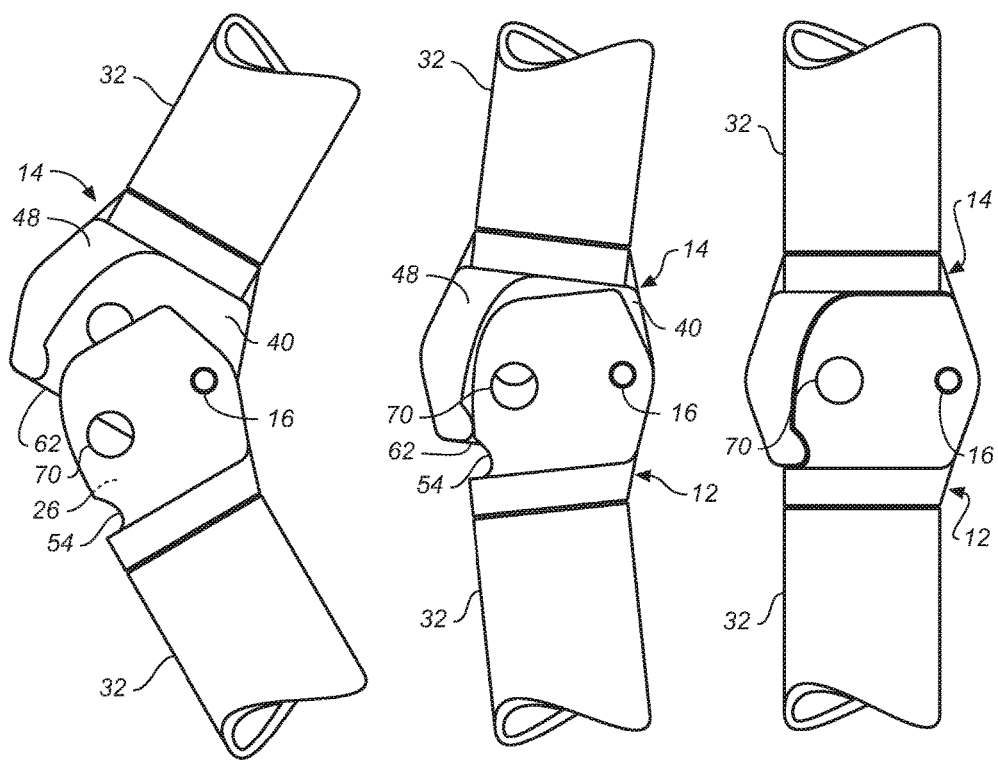

SNAP-LOCKING HINGE JOINT

CROSS-REFERENCE TO RELATED APPLICATIONS

This application claims the benefit of U.S. Provisional Application No. 62/189,166 filed Jul. 6, 2015.

BACKGROUND

Field of the Invention

The invention is directed to hinge joints and particularly to a hinge joint having a snap lock enabling the hinge joint to be locked in a stable hyperextended configuration.

Description of the Related Art

Camouflage blinds are used by hunters and wildlife photographers to observe wildlife undetected. Like a tent or canopy, a hunting blind is made of a fabric cover supported by a frame. The frame is assembled from frame members made of metal, plastic or other material of suitable strength, flexibility and weight. The frame and cover are generally carried unassembled to a field location where the blind is then assembled by detachably connecting the frame members to one another inside the cover using pinned joints in which the ends of pairs of adjoining frame members must be aligned, frequently under tension, and a pin must be inserted into holes in each of the ends. This can be a tedious and time-consuming process under any weather conditions, but even more so under the cold, early morning conditions frequently encountered when camouflage blinds are being deployed in the field.

Typically, the frame must be again disassembled into loose frame members before the camouflage blind can be moved from one location to another. Therefore, the portability and assembly of camouflage blinds could be improved if it were not necessary to assemble and disassemble the frame members of the frame in the field.

SUMMARY OF THE INVENTION

Briefly, the present invention provides a hinge joint having a snap lock that enables the hinge joint to be locked in a stable hyperextended configuration. The hinge joint can be used in one or more frame members in the frame of a camouflage blind so that the frame can be pre-assembled and can quickly and easily be erected in the field by pivoting the hinge joints of the frame members from a collapsed configuration to a locked extended configuration.

The hinge joint includes a clevis member and a flange member. The clevis member has a clevis base from which extend a pair of parallel arms forming a gap therebetween. Each of the arms has a pivot side, an engagement face transversely opposite the pivot side, and a locking recess formed in the engagement face adjacent the clevis base.

The flange member has a flange base from which extends a planar rib and a pair of locking fingers. Each of the locking fingers includes a distal end having an inwardly protruding locking tip. The rib has a pivot side transversely opposite the locking fingers that is received in the gap of the clevis member. The pivot sides of the arms are pivotally engaged with the pivot side of the rib thereby pivotally interconnecting the clevis and flange members. The clevis and flange members have a locked configuration in which the locking tips of the locking fingers are captured in the locking recesses of the arms of the clevis member.

A clevis leg extends from the clevis base, and a flange leg extends from the flange base. A clevis strut is fitted onto the clevis leg, and a flange strut is fitted onto the flange leg.

The clevis and flange members are pivotally interconnected by a pivot pin inserted through aligned pivot holes located in the arms and the rib. The pivot holes in each of the arms are located on the pivot side in a bulging prominence extending radially outward from a plane coincident with the edge of the clevis base. The pivot hole in the rib is locating on the pivot side in a bulging prominence extending radially outward from a plane coincident with the edge of the flange base.

In a collapsed configuration, the clevis and flange legs are parallel and adjacent to one another and the clevis and flange bases are disposed in and laterally spaced apart in the same plane.

In an engagement configuration, the locking tips of the locking fingers are brought into sliding contact with engagement edges formed on each clevis arm adjacent to the locking recesses. The hinge joint moves from the engagement configuration to the locked configuration by application of a sufficient pivotal force to the clevis and flange members to move the locking tips from contact with the engagement edges over the engagement edges and into the locking recesses. The hinge joint returns to the engagement configuration from the locked configuration by application of sufficient reverse pivotal force to the clevis and flange members to move the locking tips out of the locking recesses and back over the engagement edges.

In the locked configuration, the clevis and flange struts are rotated to a substantially linear configuration, but are slightly hyperextended forming an obtuse angle relative to their configuration in the collapsed configuration, and the clevis and flange bases are disposed in parallel spaced apart planes. A removable locking pin can be inserted through aligned pin holes in the rib and in each of the arms to secure the joint in the locked configuration.

BRIEF DESCRIPTION OF THE DRAWINGS

FIG. 1A is a front elevation view of a collapsible assembly using two snap-locking hinge joints according to the invention.

FIG. 1B is a front elevation view of the folding assembly of FIG. 1A shown in a collapsed configuration.

FIGS. 2A-2C are side elevation views of a snap-locking hinge joint shown in freely pivoting, engagement, and locked configurations, respectively.

DETAILED DESCRIPTION OF THE ILLUSTRATED EMBODIMENT

Figure 2D:
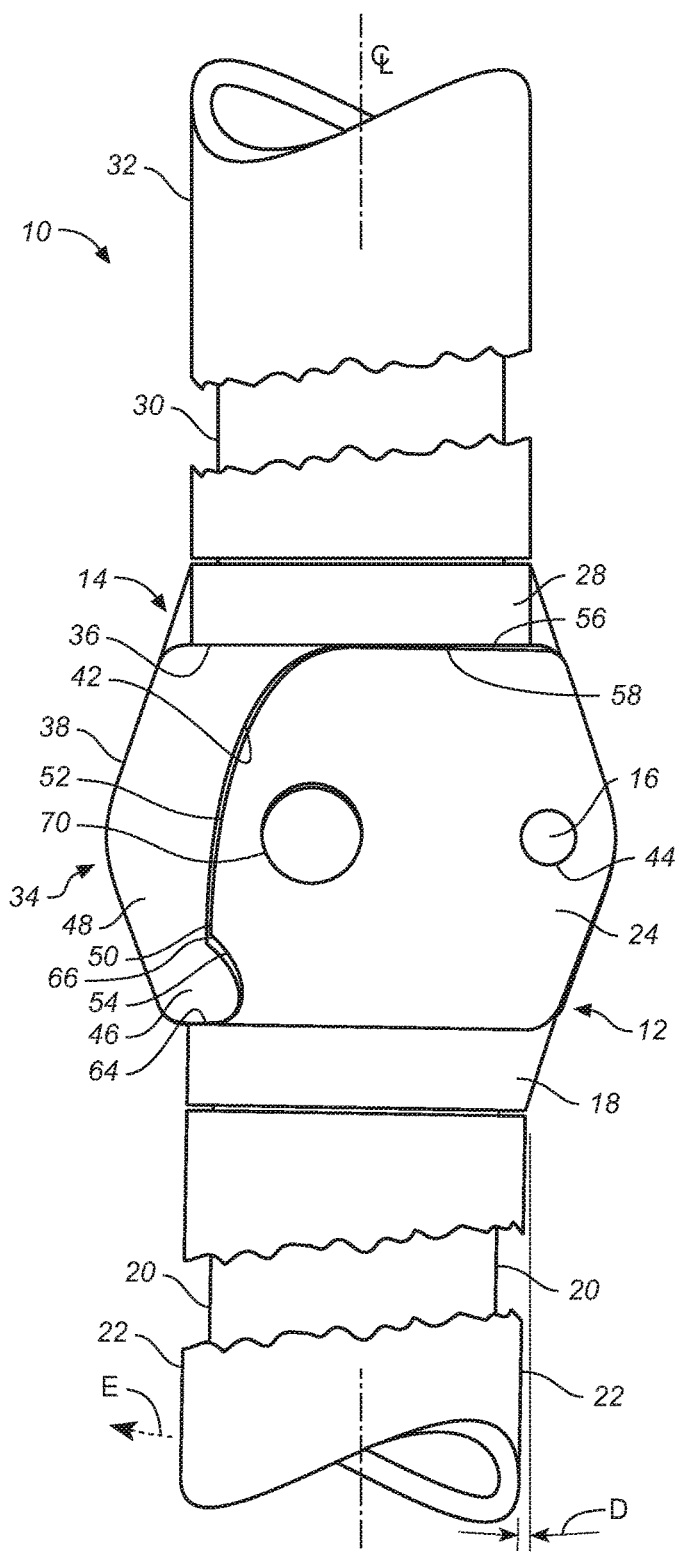
FIG. 2D is an enlargement of FIG. 2C showing the slight hyperextension of the hinge joint when in the locked configuration.

Referring now to the drawings, a snap-locking hinge joint, indicated generally at numeral 10 in FIG. 2D, comprises a clevis member 12 and a cooperating flange member 14 pivotally attached to the clevis member by a pivot pin 16.

The clevis member 12 comprises a clevis base 18 from which extends a leg 20. A strut 22 of a selected length may be fitted onto the leg 20. A spaced apart pair of clevis arms 24 extend from the clevis base 18 and define a clevis gap 26 therebetween (seen in FIG. 2A).

The flange member 14 comprises a flange base 28 from which extends leg 30. A strut 32 of a selected length may be fitted onto the leg 30. In the illustrated embodiment, struts 22, 32 have the same widths as the clevis and flange bases 18, 28 for aesthetic reasons, but the widths of the struts need not be so limited.

An arced flange 34 extending from the floor 36 of the flange base 28 comprises a planar center rib 40 extending axially from the floor 36, and two locking fingers 48 which extend laterally from the rib 40 and axially from floor 36. With additional reference to FIG. 2A, it is seen that the center rib 40 of the flange member 14 is received in the gap 26 formed between the clevis arms 24 of the clevis member 12 and pivotally connected to the clevis arms 24 by a pivot pin 16 inserted in a common pivot pin hole 44 to form a hinge joint.

Referring now to FIGS. 2A-2C, it is seen than the hinged clevis and flange members 12, 14 can be pivoted between a freely pivoting configuration shown in FIG. 2A, an engagement configuration shown in FIG. 2B, and a locked configuration shown in FIG. 2C. The clevis and flange members 12, 14 can be pivoted freely from a collapsed position where the respective struts 22, 32 thereof are folded to 180°, such as can be seen in FIG. 1B, to the engagement position shown in FIG. 2B. During such freely pivoting movement, the locking fingers 48 shown in FIG. 2D are spaced from the clevis arms 24 so that the clevis and flange members 12, 14 can be pivoted with respect to each other unimpeded. In one aspect of the invention, the width of the center rib 40 is very nearly the same as the width of the clevis gap 26 so that the clevis and flange members 12, 14 pivot easily but encounter enough frictional resistance between the inner surfaces of the clevis arms 24 and the outer faces of the center rib 40 that pivoting movement is more easily controlled.

When the clevis and flange members 12, 14 are pivoted into the engagement configuration, inwardly protruding locking tip 46 at the end of each locking finger 48 is brought into sliding contact with the engagement edge 50 of the engagement face 52 of each clevis arm 24. See FIGS. 2B and 2D. In the locked position (FIG. 2C), the locking tips 46 of each locking finger 48 are captured in locking recesses 54 formed in each clevis arm 24 adjacent clevis base 18. The locking tips 46 are moved from contact with the engagement edge 50 in the engagement position (FIG. 2B) into the locking recesses 54 in the locking position by being forced over the engagement edge 50 by application of sufficient pivoting force on the members 12, 14. This requires a sufficient amount of resilience in the materials forming the clevis arms 42 and the flange member 14, or at least the locking fingers 48 thereof. Applicant has determined that a polyvinylchloride having a fairly high modulus of elasticity is a suitable material for this application. It will be appreciated that other materials may be employed, including metals and even wood, if suitable modifications are made in the shape of the parts to coordinate interference tolerances with material elasticity.

Referring again to FIGS. 2C and 2D, when the clevis and flange members 12, 14 are in the locking configuration, further rotation of the joints is prevented by several surfaces on each member being brought into abutting contact. Thus, the leading faces 56 of each clevis arm 24 are brought into abutting contact with the floor 58 of the flange base 28; the under surfaces 24 of the locking fingers 48 are brought into abutting contact with the engagement faces 52 of each clevis arm 24; and the locking tips 46 of the locking fingers 48 and the rib end face 62 of center rib 40 are brought into abutting contact with the bottom face 64 of the clevis base 18. The leading faces 56, floor 58, rib end face 64, and bottom face 64 are disposed perpendicularly to the axial dimension of the legs 20, 30 when the hinge is in the locked configuration, providing secure platforms for supporting axial loading across the joint.

In another aspect of the invention, the clevis and flange members 12, 14 when in the locked configuration are slightly over rotated as indicated by small angle D and arrow E in FIG. 2D to further stabilize the joint when placed under an axial load, similar to the configuration of a human leg when slightly hyperextended.

Figure 3B:
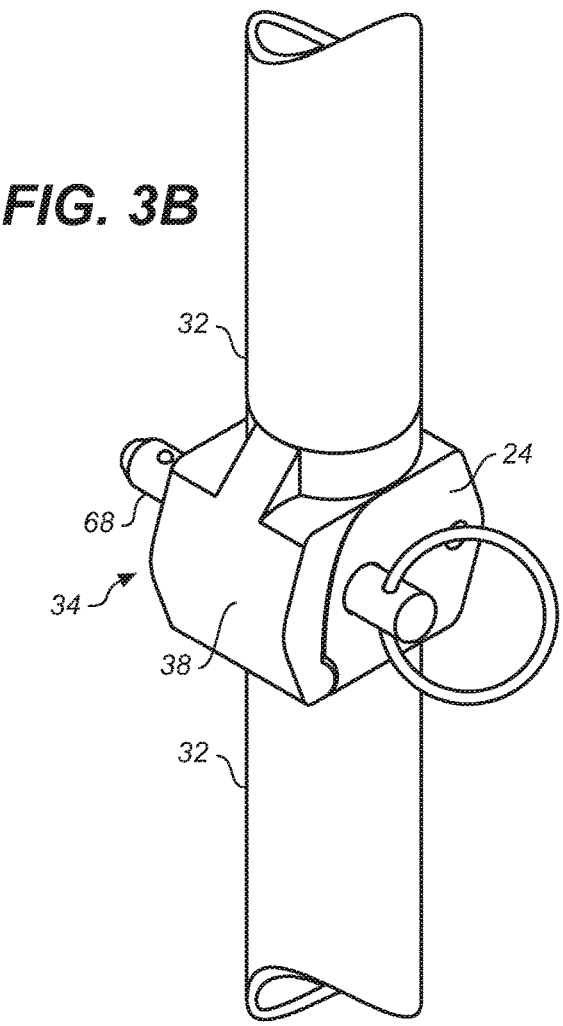
FIGS. 3A and 3B are upper perspective views of a snap-locking hinge joint in a locked configuration shown with a locking pin adjacent to and inserted in, respectively, the hinge joint.
Figure 3A:
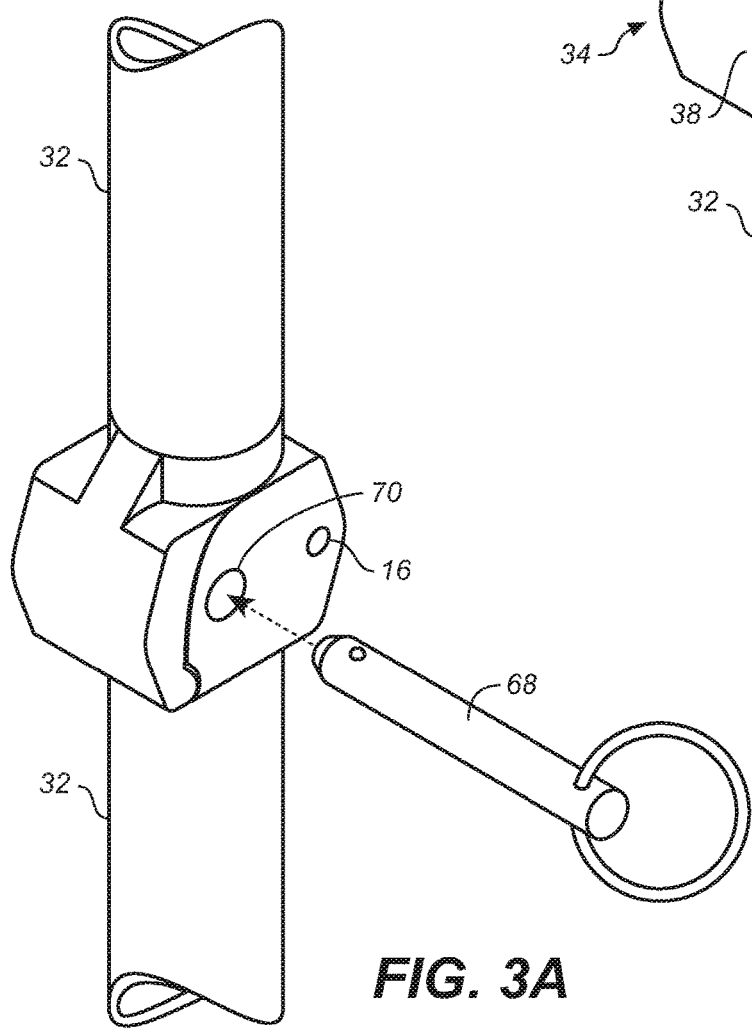

The joint is opened from the locked configuration by application of reverse pivoting force on the clevis and flange members 12, 14, causing the locking tips 46 of locking fingers 48 to ride up and over the upper edge 66 of recess 54. To ensure against unintended collapse of the joint, a removable locking pin 68 may be inserted through aligned locking pin holes 70 as seen in FIGS. 3A and 3B.

Referring to FIGS. 1A and 1B, a representative use of a snap-locking hinge joint according to the invention is described. FIG. 1A shows a pair of hinge joints 80 and dual struts 82 extending from each hinge joint. On the end of each strut 82 a swivel clamp 84 is provided for attaching the strut 82 to a support bar 86, 88. FIG. 1A shows how this assembly can be collapsed using hinge joints 80. The solid lines depict the configuration of the assembly with top support bar 86 fully raised up above bottom support bar 88 with the hinge joints 80 unfolded to extend the struts 82 laterally. The assembly can be collapsed quickly and easily by moving the hinge joints 80 outwardly and folding struts 82, as indicated by arrows F, thereby bringing the top support bar 86 down and the bottom support bar 88 up, as indicated by arrows G, to the partially unfolded position indicated by the broken lines. Thence, further folding struts 82 about hinge joints 80, as indicated by arrows H, collapses top support bar 86 onto folded struts 82 and bottom support bar 88, as indicated by arrows I, in the collapsed configuration shown in FIG. 1B.

Figure 4B:
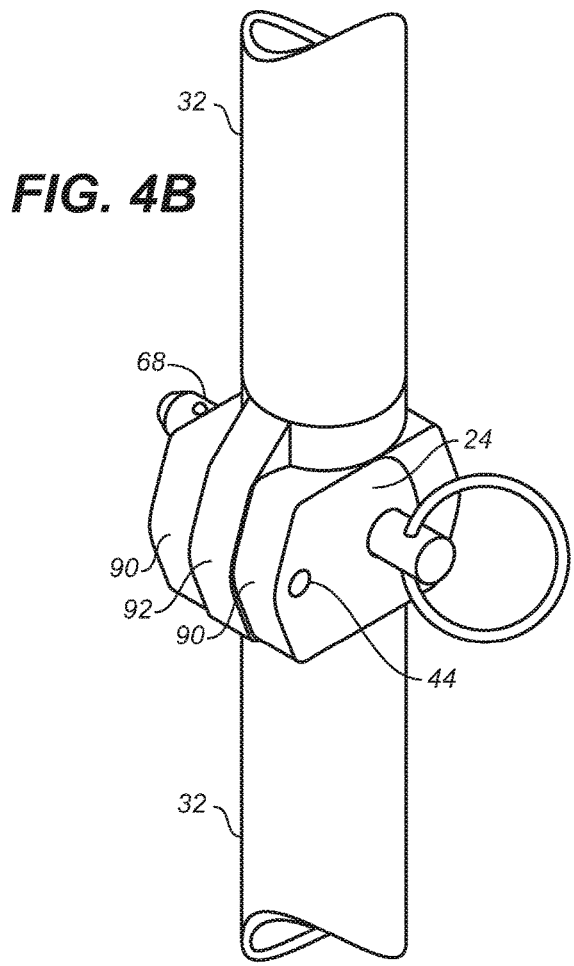
FIGS. 4A and 4B are upper perspective views of the snap-locking hinge joint shown in FIGS. 3A and 3B wherein the hinge joint has been turned 180°.
Figure 4A:
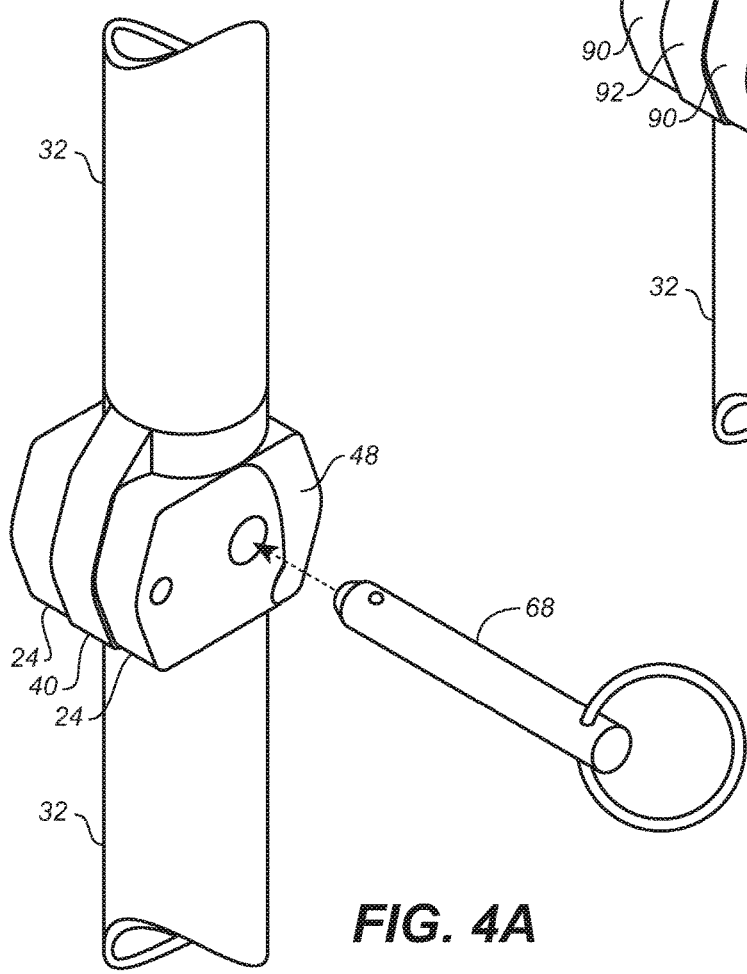

It is seen in FIGS. 4A and 4B, that pivot pin hole 44 is disposed in an outwardly bulging prominence 90 on one side of each clevis arm 24, and in a cooperating prominence 92 disposed on one side of the center rib 40. The placement of the pivot hole 44 is sufficiently off-center relative to the axial center line of the joint 80 in each of the clevis arms 24 and the center rib 40, that struts 42 can assume a parallel relationship when fully folded as shown in FIG. 1B.

Finally, it may be noted that the shape of each clevis arm 24 is substantially the same as the shape of the center rib 40. This provides maximum lateral support for the center rib 40 when the hinge is in the locked position, and is aesthetically pleasing, but the precise shapes of the clevis arms 24 and center rib 40 are not intended to be strictly limited to those illustrated.

There have thus been described and illustrated certain embodiments of a snap-locking hinge joint according to the invention. While the snap-locking hinge joint has been described above in connection with camouflage blinds, it will be appreciated that the invention is not to be so limited and has application in any situation in which a hinged support strut can be employed. Although the present invention has been described and illustrated in detail, it should be clearly understood that this disclosure is illustrative only and is not to be taken as limiting.

I claim:

1. A snap-locking hinge joint comprising:
   a clevis member having a clevis base from which extend a pair of parallel arms forming a gap therebetween, each of said arms having a pivot side and an engagement face transversely opposite said pivot side, and each of said arms having a locking recess formed in the engagement face adjacent said clevis base,
   a flange member having a flange base, a planar rib extending from said flange base, and a pair of locking fingers extending from said flange base and extending transversely from opposite sides of said rib,
      each of the locking fingers including a distal end having an inwardly protruding locking tip,
      said rib having a pivot side transversely opposite said locking fingers, and said rib received in the gap of said clevis member, and
      the pivot sides of said arms pivotally engaged with the pivot side of said rib thereby pivotally interconnecting said clevis and flange members,
   a clevis leg extending from the clevis base,
   a flange leg extending from the flange base,
   a collapsed configuration in which the clevis and flange legs are parallel and adjacent to one another and the clevis and flange bases are disposed in and laterally spaced apart in substantially the same plane, and
   a locked configuration in which the locking tips of the locking fingers of said flange member are captured in the locking recesses of the arms of said clevis member, the clevis and flange legs are hyperextended forming an obtuse angle relative to their configuration in the collapsed configuration, and the clevis and flange bases are disposed in substantially parallel spaced apart planes.

2. The snap-locking hinge joint of claim 1 further comprising:
   a clevis strut fitted onto the clevis leg, and
   a flange strut fitted onto the flange leg.

3. The snap-locking hinge joint of claim 1 wherein:
   the clevis and flange members are pivotally interconnected by a pivot pin inserted through aligned pivot holes located in said arms and said rib.

4. The snap-locking hinge joint of claim 3 wherein:
   the pivot holes in each of said arms are located on the pivot side in a bulging prominence in each of said arms extending radially outward from a plane parallel with the clevis leg and coincident with the edge of the clevis base, and
   the pivot hole in said rib is located on the pivot side in a bulging prominence extending radially outward from a plane parallel with the flange leg and coincident with the edge of the flange base.

5. The snap-locking hinge joint of claim 2 wherein:
   in an engagement configuration, the locking tips are brought into sliding contact with engagement edges formed on each clevis arm adjacent to the locking recesses.

6. The snap-locking hinge joint of claim 5 wherein:
   the hinge joint is movable from the engagement configuration to the locked configuration by application of a sufficient pivotal force to the clevis and flange members to move the locking tips from contact with the engagement edges over the engagement edges and into the locking recesses, and
   wherein the hinge joint can be returned to the engagement configuration from the locked configuration by application of sufficient reverse pivotal force to the clevis and flange members to move the locking tips out of the locking recesses and back over the engagement edges.

7. The snap-locking hinge joint of claim 1 wherein:
   the clevis member and the flange member each comprise a polyvinylchloride.

8. The snap-locking hinge joint of claim 1 further comprising:
   a removable locking pin insertable through aligned pin holes in said rib and in each of said arms for securing the clevis and flange members in said locked configuration.

9. A snap-locking hinge joint comprising:
   a clevis member having a clevis base and a clevis leg extending from the clevis base, a pair of parallel arms extending from said clevis base opposite said clevis leg and forming a gap therebetween, said clevis base having a peripheral edge, each of said arms having a pivot side and an engagement face transversely opposite said pivot side, each of said pivot sides having a bulging prominence extending radially outward from a plane coincident with the edge of the clevis base, each of said bulging prominences having a pivot hole, and each of said engagement faces having a locking recess formed adjacent said clevis base,
   a flange member having a flange base and a flange leg extending from the flange base, said flange base having a peripheral edge, a planar rib and a pair of locking fingers extending from said flange base opposite said flange leg, said locking fingers extending transversely from opposite sides of said rib,
      each of the locking fingers including a distal end having an inwardly protruding locking tip,
      said rib having a pivot side transversely opposite said locking fingers, said pivot side having a bulging prominence extending radially outward from a plane coincident with the edge of the flange base, said rib received in the gap of said clevis member, said bulging prominence of said rib including a pivot hole,
   a pivot pin inserted in the pivot holes in the arms of said clevis member and in the pivot hole of the rib of said flange member thereby pivotally interconnecting the clevis and flange members,
   a collapsed configuration in which the legs are in parallel and adjacent disposition and the clevis and flange bases are spaced apart in the same plane, and
   a locked configuration in which the legs are pivoted to a substantially linear configuration and are hyperextended forming an obtuse angle relative to their configuration in the collapsed configuration, the locking tips of said locking fingers are captured in the locking recesses of the arms of said clevis member, and the clevis and flange bases are disposed in parallel spaced apart planes.

10. The snap-locking hinge joint of claim 9 wherein:
    said clevis and flange members comprise a polyvinylchloride.

* * * * *